United States Patent [19]

Allardyce et al.

[11] Patent Number: 5,440,783

[45] Date of Patent: Aug. 15, 1995

[54] ASSIST STRAP

[75] Inventors: James D. Allardyce, Grandville; Walter M. Weiland; Jay M. Frankhouse, both of Holland, all of Mich.

[73] Assignee: Prince Corporation, Holland, Mich.

[21] Appl. No.: 163,472

[22] Filed: Dec. 7, 1993

Related U.S. Application Data

[63] Continuation-in-part of Ser. No. 831,976, Feb. 6, 1992, Pat. No. 5,285,551.

[51] Int. Cl.$^6$ .............................................. B60N 3/02
[52] U.S. Cl. ........................... 16/110 R; 16/DIG. 24; 296/71
[58] Field of Search .................. 190/115; 296/71; 105/354; 49/460; 297/183; 16/110 R, 125, DIG. 28, 124, DIG. 24, DIG. 25, 111 R

[56] References Cited

U.S. PATENT DOCUMENTS

| | | | |
|---|---|---|---|
| Re. 21,512 | 7/1940 | Creamer | 16/125 |
| 773,835 | 11/1904 | White | 16/DIG. 28 |
| 1,454,253 | 5/1923 | Rissman | 16/DIG. 28 |
| 1,500,029 | 7/1924 | Oliver | 16/111 R |
| 1,742,867 | 1/1930 | Levi | 16/110 R |
| 2,105,580 | 1/1938 | Bechik | 16/DIG. 28 |
| 2,114,542 | 4/1938 | Rydquist | 16/DIG. 28 |
| 2,144,910 | 1/1939 | Churchill | 411/520 |
| 2,244,977 | 6/1941 | Hansman et al. | 411/524 |
| 2,327,328 | 8/1943 | Murphy | 411/520 |
| 2,663,342 | 12/1953 | Reiter | 16/110 R |
| 2,845,155 | 7/1958 | Kinnersley | |
| 2,903,939 | 9/1959 | Meyer | 411/524 |
| 3,039,506 | 6/1962 | Reiter | 16/110 R |
| 3,182,367 | 5/1965 | Hamann et al. | 16/125 |
| 3,243,020 | 3/1966 | Freidlander | 16/110 R |
| 3,269,495 | 8/1966 | Bush | 16/110 R |
| 3,707,016 | 12/1972 | Smoot | 16/125 |
| 3,736,621 | 6/1973 | Szabo | 16/125 |
| 3,952,383 | 4/1976 | Moore et al. | |
| 3,977,054 | 8/1976 | Moore et al. | 16/110 R |
| 4,016,315 | 4/1977 | Szabo | 16/116 R |
| 4,064,594 | 12/1977 | Teti et al. | 16/125 |
| 4,174,988 | 11/1979 | Moore et al. | |
| 4,356,592 | 11/1982 | Moore | 16/125 |
| 4,357,734 | 11/1982 | Moore | 16/125 |
| 4,373,229 | 2/1983 | Moore | 16/125 |
| 4,409,163 | 10/1983 | Van Manen | 264/45.5 |
| 4,502,181 | 3/1985 | Gonas | |
| 4,525,231 | 6/1985 | Wnuk | 156/185 |
| 4,547,954 | 10/1985 | Van Manen | 29/458 |
| 4,556,245 | 12/1985 | Gruenwald | 16/110 R |
| 4,686,741 | 8/1987 | Moore et al. | 16/112 |
| 4,696,077 | 9/1987 | Kim | 16/125 |
| 4,754,858 | 7/1988 | Robinson | 16/116 A |
| 4,794,668 | 1/1989 | Lorence et al. | 16/125 |
| 4,971,645 | 11/1990 | Licus | 16/125 |

FOREIGN PATENT DOCUMENTS

| | | | |
|---|---|---|---|
| 1288515 | 2/1962 | France | 190/115 |
| 1562374 | 2/1969 | France | 16/110 R |
| 222661 | 1/1973 | Germany | 16/125 |
| 2883335 | 3/1990 | Japan | 16/116 R |
| 5-115317 | 5/1993 | Japan | 190/115 |
| 216172 | 10/1967 | Sweden | |
| 814482 | 6/1959 | United Kingdom | 296/71 |
| 1174605 | 12/1969 | United Kingdom | |

Primary Examiner—Lowell A. Larson
Assistant Examiner—Donald M. Gurley
Attorney, Agent, or Firm—Price, Heneveld, Cooper, DeWitt & Litton

[57] ABSTRACT

An assist strap is made of a flexible exoskeleton of a tubular shape which overlies a tubular core to provide a strong yet cushioned strap. Opposite ends of the strap are held by clamps which in turn are secured to a vehicle for attaching the strap to a vehicle.

14 Claims, 3 Drawing Sheets

ASSIST STRAP

This application is a continuation-in-part of U.S. patent application Ser. No. 07/831,976 filed on Feb. 6, 1992, now U.S. Pat. No.5,285,551, and entitled Assist Strap.

BACKGROUND OF THE INVENTION

The present invention pertains to an assist strap for use in a vehicle such as an automobile.

Assist straps, or grab handles are in common use in vehicles and frequently are mounted to the vehicle roof above a door for assistance in ingress and egress from the vehicle. Assist straps are also frequently mounted to vehicle doors for assistance in closing them. In the past, the construction of assist straps or handles have included a metal strap which has been cushioned and upholstered and anchored at opposite ends by suitable mounting brackets. Common to the assist strap art is the utilization of a central structural member, typically a flat metal band which is subsequently surrounded by adding material to provide a comfortable feel to the assist strap. Such construction, however, results in the relatively sharp edges of the flat strap being somewhat uncomfortable and, over a period of time can lead to wearing of the assist strap due to the sharp edges of the band cutting into the covering material. Additionally, such construction typically requires multiple components and processing steps for the manufacture of the straps. The strap body alone includes a band, a foam cushion layer, and an outer decorative covering. This also increases the cost of such devices.

SUMMARY OF THE PRESENT INVENTION

The assist strap of the present invention overcomes the difficulties of the prior art by providing an assist strap with a flexible exoskeleton of a tubular shape which overlies a high density foam core, or in one embodiment a tubular member, to provide a strong yet cushioned strap. Opposite ends of the strap are held by clamping means in turn secured to a vehicle.

The resultant construction provides an integral two-section assist strap with a somewhat cushioned feel and sufficient strength and rigidity to withstand normal use in a vehicle. It provides an oval, circular, or other desired cross-sectional shape instead of the generally flat commonly used strap configuration. This strap design is relatively inexpensive and provides improved performance over existing strap designs. These and other features, objects and advantages of the present invention will become apparent upon reading the following description thereof together with reference to the accompanying drawings in which:

DETAILED DESCRIPTION OF THE PREFERRED EMBODIMENT

Figure 1:
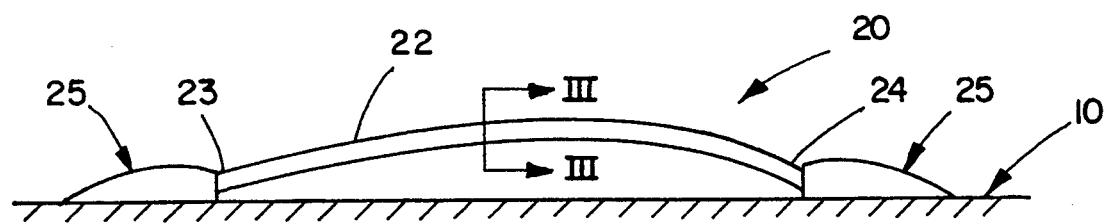
FIG. 1 is a side elevational view of an assist strap embodying the present invention and mounted within a vehicle.
Figure 2:
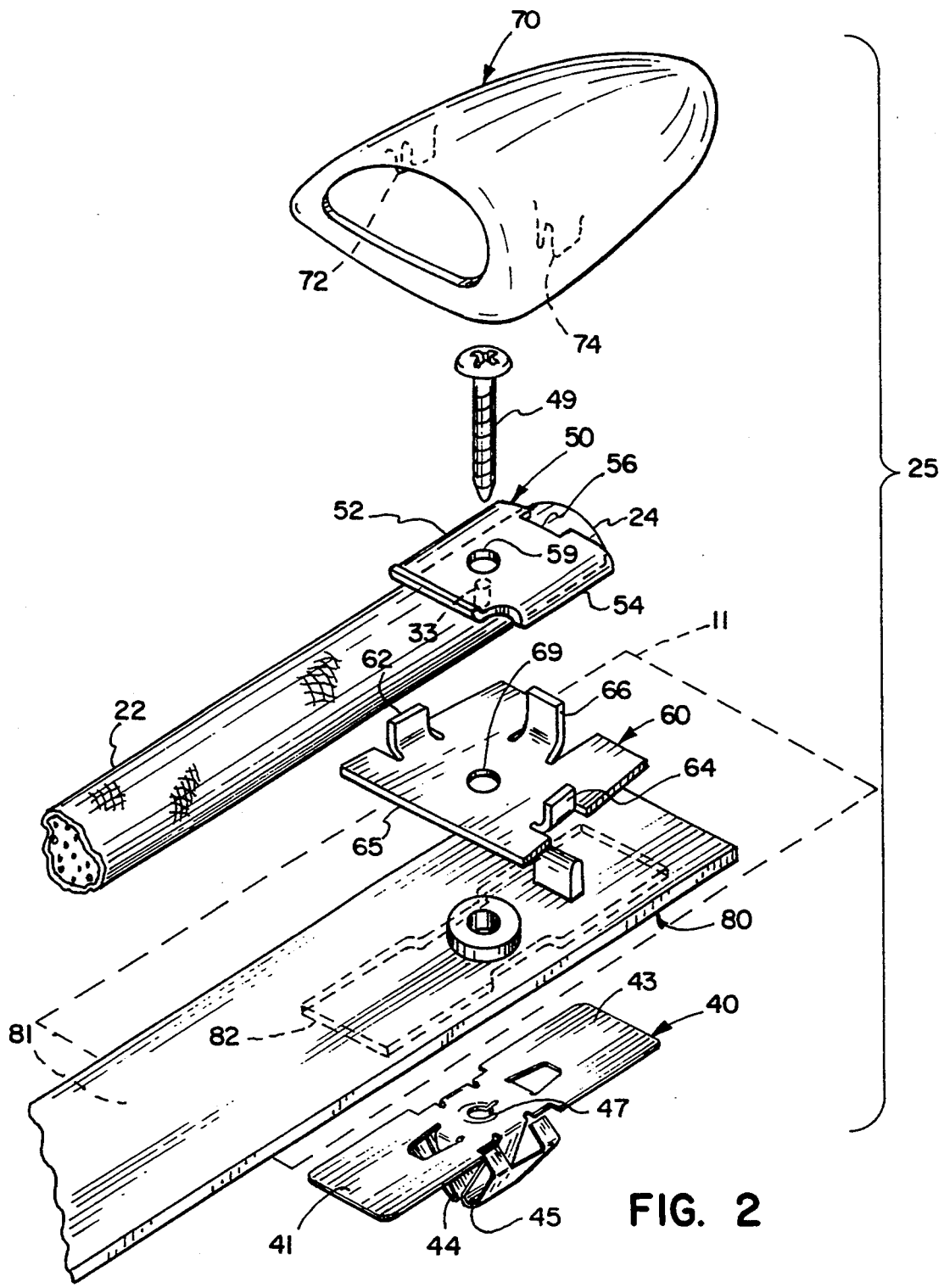
FIG. 2 is an enlarged fragmentary exploded view of one end of the assist strap of the present invention and its mounting means.

Referring initially to FIG. 1, there is shown schematically a support member 10 of a vehicle such as an automobile. The support member 10 may be a vehicle roof, a vehicle door panel, or other area of an interior of a vehicle to which one or more assist straps 20 embodying the present invention are installed. The assist strap 20 includes a composite strap member 22 coupled at opposite ends 23 and 24 to support member 10 by means of mounting assemblies 25 as best seen in FIG. 2. The mounting assemblies are covered by decorative caps 70 (FIG. 2) at each end of the strap 22 to provide a trim appearance to the installation. Turning now to the exploded fragmentary view of FIG. 3, there is shown the body of the unique strap construction 22 which comprises an exoskeleton 30 made of a 100% NYLON web woven in a tubular shape. In the preferred embodiment, the fabric was 840 denier although a range of from about 600 to 1000 is suitable. The tubular web 30 of material is generally circular before being filled with the oval core material 32. The diameter of the exoskeleton 30 is approximately 1" in the preferred embodiment, although different sized webs and cores can be provided. The exoskeleton webbing 30 is commercially available from Lee & Sachs, Inc., of Des Plaines, Ill.

Figure 3:
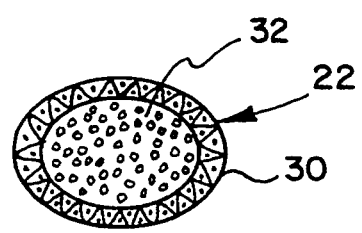
FIG. 3 is an enlarged cross-sectional view taken along section lines III—III of FIG. 1.

Completing the body of the assist strap 22 is a high density foam polymeric core material 32. In the preferred embodiment, ETHAFOAM polyethylene foam was employed and is commercially available from Dow Chemical as Model No. HS-600. This or other high density foam polymeric material which meets motor vehicle safety standards No. 302 for automotive applications can be employed. The oval foam core 32 is cut front blanks of such foam material using a hot wire cutting machine to form the oval cross-sectional configuration. The foam core 32 is then compressed slightly and, while slightly expanding a section of the webbing material 30, the foam material 32 is inserted into the webbing and allowed to expand to provide a snug interface between the structural foam core 32 and the exoskeleton 30 as seen in FIG. 3. The tips of the opposite ends 23 and 24 of the strap 22 thus formed are sealed by compression and a hot melt adhesive for terminating the free ends of the assist strap 22. As can be seen in FIG. 2, the length of the assist strap 22 exceeds the spacing between the mounting assemblies 25 such that the handle so formed is convexly curved with respect to the surface of mounting member 20 to provide access for the hand of the user. The rigid foam material maintains the grab handle in this shape upon installation. The mounting of each of the ends of the unique strap construction is disclosed in FIG. 2 which is now described.

Each of the identical mounting assemblies includes a spring mounting clip 40, a lower compression clamp member 60, an upper compression clamp member 50, a fastener 49 and a cover 70. Optionally, as described below, a backing plate 80 may be interposed between fastening clip 40 behind a vehicle panel 11 and under the lower clamp 60. Each end 23 and 24 of strap 22 is compressively held between members 50 and 60 and to clip 40 mounted to the vehicle by the fastener 49. The spring mounting clip 40 is commercially available and of generally conventional construction having a pair of outer top flanges 41 and 43 and spring-loaded legs 44 and 45 which are inserted into a rectangular aperture in the sheet metal support forming part of the support member 10 of the vehicle. Flanges 41 and 43 abut against the outer surface of the upholstery material covering the sheet metal structural member once the clip 40 has been installed. Clip 40 includes a threaded aperture 47 for receiving a Phillips head fastening screw 49 for installation of the grab handle.

Each end of grab handle 22 includes an aperture 33 which can be formed by the insertion of screw 49 therethrough or pre-punched as desired. End 24 is compressibly held between an upper clamping plate 50 and a lower clamping plate 60 to the structural support member 10 of the vehicle by the insertion of fastener 49 through aperture 59 in plate 50 and 69 in plate 60 and thence into the threaded aperture 47 of the spring clip 40. A decorative cover cap 70 can be molded of a suitable polymeric material and includes downwardly directed spaced flanges 72 and 74 for gripping upwardly extending posts 62 and 64 respectively of lower plate 60. The spring clip 40, upper and lower clamping plates 50 and 60, strap 22, and cap 70 can be preassembled and installed to a panel such as a headliner or door panel by the manufacturer and subsequently installed in the vehicle by press-fitting clips 40 into aligned apertures formed in the underlying support member 10 if desired. Having described the overall construction of the system, a somewhat more detailed description of the individual components of the mounting assembly shown in FIG. 2 is now presented.

The upper compressive member 50 includes downwardly curved opposite edges 52 and 54 which overlie the outer diameter of the generally tubular handle 22 tending to envelop the ends of the strap once in a compressed installed position. The outer edge of plate 50 includes a notch 56 for receiving an upwardly projecting tang 66 of plate 60 for indexing the two compression members against relative rotation. Member 50 thus is lockably aligned with member 60. The apertures 59 and 69 align with aperture 47 of clip 40. The distance between the upstanding tabs 62 and 64 accommodates edges 52 and 54 therebetween such that member 50 nests and is lockably held within member 60 upon the tightening of fastener 49. Fastener 49 is extended through aperture 59, through aperture 33 of strap 22, aperture 69, and is threaded into aperture 47 of fastener 40. The screw is tightened sufficiently so that the end of strap 22 becomes substantially flattened and a rigid interconnection between the end and plates 50 and 60 is achieved. The molded polymeric decorative cap 70 is then snapped over upwardly extending tabs 62 and 64 of plate 60 to cover the mounting plates 50, 60 and end of the strap. Each of the ends of the strap 22 are so terminated to provide a clean and yet functional assist handle as seen in FIG. 1. Members 50 and 60 can be stamped from steel parts suitably treated against rust in a conventional manner as is spring clip 40.

In embodiments of the invention where the assist strap is mounted to, for example, the headliner of a vehicle, a backing plate may be desirable. As seen in FIG. 2, in phantom form, a headliner 11 includes a backing plate 80 which can be positioned on the undersurface of the headliner and which includes a recess 82 formed therein for overlying and receiving clip 40. In this installation, the headliner is interposed between the upper surface 81 of backing plate 80 and the lower surface 65 of clamping plate 60. Fastening screw 49 compresses strap 22 between clamping members 50 and 60 and clamps headliner 11 between backing plate 80 and clamp 60 as well as attaches the entire assembly to the clip 40 which is subsequently inserted into a rectangular socket formed in the sheet metal roof of the vehicle.

Figure 6:
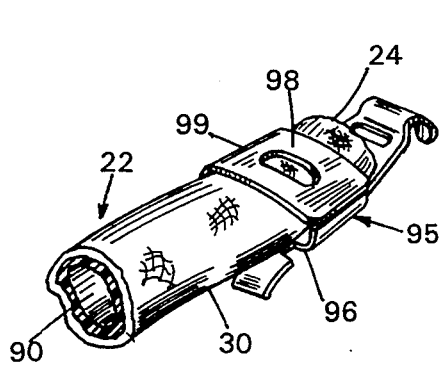
FIG. 6 is a fragmentary perspective view of the end of the assist strap shown in FIG. 5 shown partially assembled.
Figure 4:
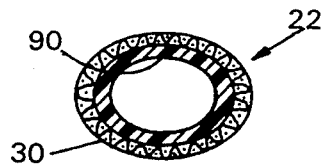
FIG. 4 is a cross-sectional view of an alternative embodiment of a strap shown also in FIGS. 5 & 6.
Figure 5:
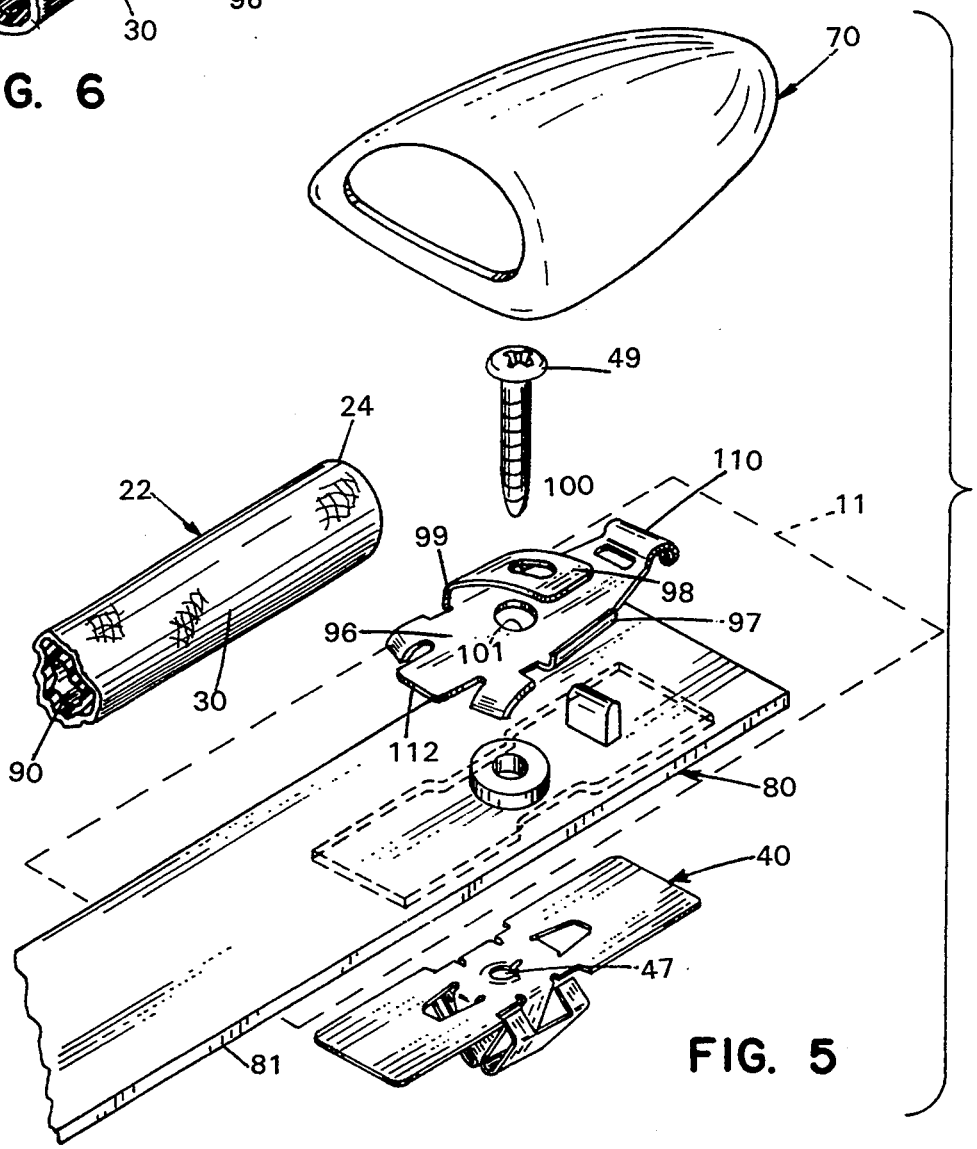
FIG. 5 is a fragmentary exploded perspective view of one end of the alternative embodiment of the assist strap.

Referring to the alternative embodiment shown in FIGS. 4–6, similar parts to that of the first embodiment are numbered with corresponding reference numerals. In this embodiment, the tubular assist strap 22 comprises a hollow tubular polymeric core 90 surrounded by the web 30 of the same construction as that of the first embodiment. Tubular member 90 is preferably made of a resilient polymeric material such as extruded vinyl such as PVC and in the preferred embodiment as best seen in FIG. 4 has an oval cross-section. The wall thickness of the hollow tubular member 90 in the preferred embodiment is about 0.090 inches although other wall thicknesses in other suitable resilient hollow polymeric materials can be employed. Member 90 has a durometer hardness of about 85. The end 24 of assist strap 22 is captively held as best seen in FIG. 6 by a clamp 95 also seen in FIG. 5. Clamp 95 comprises a lower plate 96 with an upwardly turned edge lip 97 and upper plate 98 integrally joined to lower plate 96 at an edge 99. Plate 98 includes an aperture 100 therethrough for receiving a fastening screw 49 for attaching the end 24 of assist strap 22 to the headliner 11 and backing plate 80 together with fastener 40 to the sheet metal roof of the vehicle. For such purpose, the lower plate 96 also includes an aperture 101 aligned with aperture 100 which receives fastening screw 49.

Clamp 95 is made of a deformable material such as steel, such that plate 98 can be compressed downwardly to compress end 24 of assist strap 22 to preassemble clamps 95 on the opposite ends of the assist strap prior to mounting of the assist strap to the headliner and snap-in fastener 40. For such purpose, clamp 95 can be stamped from steel having a thickness of for example, 1/32 inches, and which is suitable treated to resist rest in the automotive environment. Clamp 95 is formed to include a mounting tab 110 at one end for receiving the decorative cap 60 and interlocks to the cap. Tabs 112 at the opposite end of clamp 95 also interact and interlock cap 70 to the clamp.

During assembly, a pair of the decorative caps are placed over the assist. Strap 22 which is aligned within a clamp 95 between plates 96 and 98. Plate 98 is subsequently compressed as shown in FIG. 6 to temporarily grip the assist strap. The fastening screw 49 is then inserted through aperture 100, assist strap 22, aperture 101 and through the headliner and backing plate 80 into the aperture 47 of fastening clip 40 to secure the assist strap to the headliner 11 for subsequent installation into a vehicle. Caps 70 are then slid over the clamps 95 at the opposite ends of the assist strap.

It will become apparent to those skilled in the art that various modifications to the preferred embodiments of the invention described herein can be made but will fall within the spirit of the invention as defined by the appended claims.

The embodiments of the invention in which an exclusive property or privilege is claimed are defined as follows:

1. An assist strap for use in a vehicle comprising:

a tubular exoskeleton made of a flexible material;

a tubular insert for said tubular exoskeleton made of a cushioning material, said tubular insert surrounded by said exoskeleton to form a strap including only said tubular insert and said exoskeleton; and a clamp for attaching opposite ends of said strap to a vehicle, said clamp comprising a pair of plates positioned on opposite sides of each end of said strap, wherein each plate includes an aperture for receiving a fastening screw which extends through said plates and said strap.

2. The apparatus as defined in claim 1 wherein said tubular exoskeleton is made of a woven fabric.

3. The apparatus as defined in claim 2 wherein said insert is a polymeric tube.

4. The apparatus as defined in claim 3 wherein said tubular insert has a wall thickness of about 3/32 inches.

5. The apparatus as defined in claim 4 wherein said tubular insert is made of vinyl.

6. The apparatus as defined in claim 5 wherein said tubular insert has an oval cross-section.

7. The apparatus as defined in claim 6 wherein said woven fabric is NYLON.

8. The apparatus as defined in claim 4 wherein said woven fabric has a denier of from about 600 to 1000.

9. The apparatus as defined in claim 1 wherein said plates are integrally formed with said clamp which is made of a deformable material.

10. The apparatus as defined in claim 1 wherein said clamp includes a base defining one of said pair of plates and the other of said pair of plates integrally extends from an edge of said base.

11. An assist strap for use in a vehicle comprising:

a core of tubular vinyl having a generally circular cross-section;

a cover for said core, said cover comprising a tubular flexible woven Nylon having a denier of from about 600 to 1000 covering said core and together with said core having sufficient strength to provide the sole support for the assist strap defined by said core and cover;

a clamp for attaching opposite ends of said strap to a vehicle, wherein said clamp comprises a pair of plates mounted on opposite sides of an end of said strap, said plates integrally joined to one another along an edge; and a snap-in clip for attachment to a vehicle, said clip including an aperture for receiving a fastening screw, and wherein said plates each include an aperture for receiving a fastening screw.

12. An assist strap for a vehicle comprising:

a strap formed by inserting a tubular polymeric material within a tubular sleeve of woven fabric;

a pair of plates extending on opposite sides of said strap for compressively clamping opposite ends of said strap and for attaching said opposite ends to a vehicle, said plates each including an aperture therethrough which are in alignment with one another; and a fastener extending through said apertures in said plates and through said strap for attaching said strap to a vehicle.

13. The apparatus as defined in claim 12 wherein said core is oval in cross-section.

14. The apparatus as defined in claim 13 wherein said woven fabric is NYLON.

* * * * *